(12) United States Patent
Scheib et al.

(10) Patent No.: US 7,540,209 B2
(45) Date of Patent: Jun. 2, 2009

(54) NEUTRAL SWITCH SYSTEM FOR TRANSMISSION

(75) Inventors: Patrick L. Scheib, Pinehurst, NC (US); Kenneth T. Picone, Pinehurst, NC (US)

(73) Assignee: ArvinMeritor Technology, LLC, Troy, MI (US)

( * ) Notice: Subject to any disclaimer, the term of this patent is extended or adjusted under 35 U.S.C. 154(b) by 630 days.

(21) Appl. No.: 11/098,833

(22) Filed: Apr. 5, 2005

(65) Prior Publication Data

US 2006/0230861 A1    Oct. 19, 2006

(51) Int. Cl.
*F16H 59/68* (2006.01)

(52) U.S. Cl. .................................... 74/335; 200/61.91

(58) Field of Classification Search ................. 74/325, 74/331, 333, 335, 343, 359, 471 R, 473.3, 74/473.36, 73.3, 473.12, 473.37; 200/61.88, 200/61.91; 340/456
See application file for complete search history.

(56) References Cited

U.S. PATENT DOCUMENTS

| | | | | |
|---|---|---|---|---|
| 4,266,438 A | * | 5/1981 | Kessmar | 74/473.36 |
| 4,415,786 A | * | 11/1983 | Takada et al. | 200/61.91 |
| 4,539,447 A | * | 9/1985 | Mizutani et al. | 200/61.91 |
| 5,031,472 A | * | 7/1991 | Dutson et al. | 74/335 |
| 5,477,742 A | * | 12/1995 | Burger | 74/473.26 |
| 5,813,285 A | * | 9/1998 | Niimi | 74/473.3 |
| 5,879,267 A | | 3/1999 | Desautels | |
| 6,027,426 A | * | 2/2000 | Holman | 477/99 |
| 6,683,263 B1 | * | 1/2004 | Scheib et al. | 200/61.88 |
| 7,104,150 B2 | * | 9/2006 | Ito et al. | 74/335 |

* cited by examiner

*Primary Examiner*—Richard W L Ridley
*Assistant Examiner*—Phillip Johnson
(74) *Attorney, Agent, or Firm*—Carlson, Gaskey & Olds PC

(57) ABSTRACT

A vehicle transmission includes a plurality of shift shafts that cooperate with a common neutral switch to control when range shifts occur. In one example, the plurality of shift shafts includes a first shift shaft, a second shift shaft, and a third shift shaft that is positioned between the first and second shift shafts. A plunger actuates the neutral switch in response to movement of the third shift shaft along an axis. A first switch pin is positioned between the first shift shaft and the plunger and a second switch pin is positioned between the second shift shaft and the plunger. The first and second switch pins move the plunger to actuate the neutral switch in response to axial movement of a respective one of the first and second shift shafts. Thus, each of the first, second, and third shifts shafts can actuate a single neutral switch by cooperating with a common plunger.

20 Claims, 1 Drawing Sheet

NEUTRAL SWITCH SYSTEM FOR TRANSMISSION

TECHNICAL FIELD

The subject invention concerns a vehicle transmission having a plurality of shift shafts that cooperate with a common neutral switch to control when range shifts occur.

BACKGROUND OF THE INVENTION

Heavy duty tractor-trailer transmissions, often referred to as Class 8 transmissions, are adapted to be manually shifted to provide several different speed ratios. A plurality of gears are supported along a shift shaft, which can be moved or shifted along a shift axis to change to a desired gear ratio from amongst one of the plurality of gears. Typically, multiple shift shafts are used to provide a greater range of gear ratios. Controls are required to provide smooth shifts during range shifting between the different shift shafts.

Class 8 transmissions have increased in complexity as traditional pneumatic controls have been converted to electric controls. In a typical pneumatically controlled system, the shift shafts were each mechanically linked to a slave valve in order to control when range shifts occur. This was accomplished by using a checkshaft that moved perpendicularly relative to the shift axis in response to axial movement of any one of the shift shafts.

When pneumatically controlled systems were replaced by electric controlled systems, the slave valve was replaced by a neutral switch and pin assembly. The pin actuated the neutral switch in response to movement of the checkshaft. In both types of controls, the goal is to ensure the main transmission is in neutral (i.e., no gear is engaged in the main transmission) when the range shift occurs. One disadvantage with this configuration is that movement of the checkshaft in such a manner adversely affects drive shift feel.

Thus, there is a need for a neutral switch system for a vehicle transmission that does not require a checkshaft.

SUMMARY OF THE INVENTION

A vehicle transmission includes a plurality of shift shafts that cooperate with a common neutral switch to control the occurrence of range shifts. A plunger actuates the neutral switch in response to axial movement of one of the plurality of shift shafts. Switch pins move the plunger to actuate the neutral switch in response to axial movement of other shift shafts.

In one example, the plurality of shift shafts includes a first shift shaft, a second shift shaft, and a third shift shaft that is positioned between the first and second shift shafts. The plunger actuates the neutral switch in response to movement of the third shift shaft. A first switch pin is positioned between the first shift shaft and the plunger and a second switch pin is positioned between the second shift shaft and the plunger. The first and second switch pins move the plunger to actuate the neutral switch in response to movement of a respective one of the first and second shift shafts.

The plunger includes a base portion with a pin body extending outwardly from the base portion toward the third shift shaft. The pin body has a smaller cross-section than the base portion. The pin body moves axially upwardly in a first direction to actuate the neutral switch in response to axial movement of the third shift shaft in a second direction. First and second switch pin engagement surfaces are formed on opposing faces of the base portion. The first switch pin reacts against the first switch pin engagement surface to actuate the neutral switch in response to movement of the first shift shaft. The second switch pin reacts against the second switch pin engagement surface to actuate the neutral switch in response to movement of the second shift shaft.

The first, second, and third shift shafts each have a variable surface profile that is aligned with a respective one of the first and second switch pins, and plunger. The variable surface profile on the first shift shaft cooperates with the first switch pin to move the first switch pin against the plunger in response to shifting of the first shift shaft. The variable surface profile on the second shift shaft cooperates with the second switch pin to move the second switch pin against the plunger in response to shifting of the second shift shaft. Movement of the first and second switch pins against the plunger causes the plunger to actuate the neutral switch. The variable surface profile on the third shift shaft cooperates with the plunger to move the plunger directly against the neutral switch in response to shifting of the third shift shaft.

The subject invention provides a neutral switch system for a vehicle transmission that can be used with a plurality of shift shafts, and which does not require a checkshaft. These and other features of the present invention can be best understood from the following specification and drawings, the following of which is a brief description.

DETAILED DESCRIPTION OF THE PREFERRED EMBODIMENT

Figure 1:
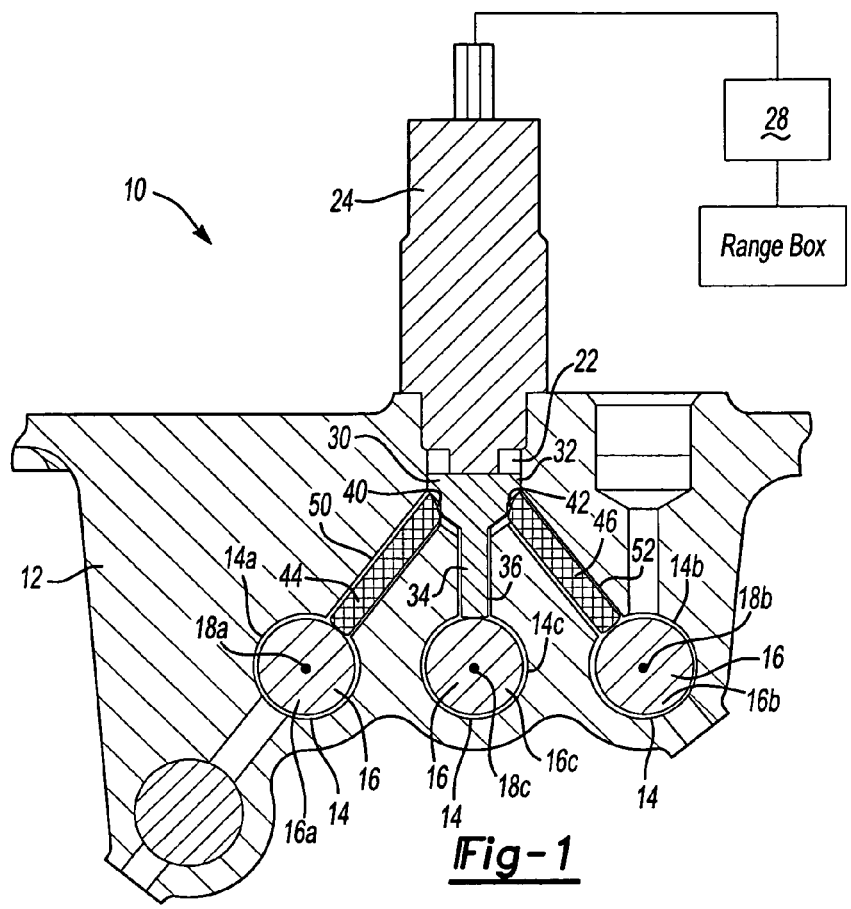
FIG. 1 is a schematic cross-sectional view of a neutral switch system for a vehicle transmission incorporating the subject invention.

A portion of a transmission 10 is shown schematically in FIG. 1. The transmission 10 includes a housing 12 that could include any number of housing components, which can be secured together in any suitable manner. The housing 12 includes at least one bore or opening 14 for receiving a shift shaft 16. In the example shown in FIG. 1, a plurality of openings 14 are formed within the housing 12 with one shift shaft 16 received within each opening 14. However, a plurality of shift shafts 16 could be received within a common opening 14.

Each shift shaft 16 defines an axis 18 (FIG. 2) along which the shift shaft 16 moves in response to drive shift requests. At least one shift fork (not shown) cooperates with the shift shafts 16 to shift between gear ratios.

The housing 12 also includes a bore 22 for receiving a neutral switch 24. In the example shown, the neutral switch 24 is orientated generally transverse to the shift shaft 16. The shift shaft 16 cooperates with the neutral switch 24 to control shifting between ranges. The neutral switch 24 is electrically connected to a controller 28 and range box as known. The operation of a neutral switch 24 is known and will not be discussed in detail. Any type of neutral switch 24 can be used. Generally, when the neutral switch 24 is actuated, it provides an indication that the transmission 10 is in neutral, and that the timing of a required range shift is proper. Controller 28 then actuates a range shift, as known.

In the example shown, the transmission 10 includes a first shift shaft 16a in a first opening 14a, a second shift shaft 16b in a second opening 14b, and a third shift shaft 16c in a third opening 14c. The first shift shaft 16a is axially translatable along a first axis 18a, the second shift shaft 16b is axially translatable along a second axis 18b, and the third shift shaft 16c is axially translatable along a third axis 18c. The third shift shaft 16c is positioned between the first 16a and second 16b shift shafts. Further, the first 16a, second 16b, and third 16c shift shafts are generally parallel to each other.

The neutral switch 24 is preferably positioned over the third shift shaft 16c. A plunger 30 is positioned between the neutral switch 24 and third shift shaft 16c. The plunger 30 actuates the neutral switch 24 in response to shifting movement of the third shift shaft 16c. The plunger 30 includes a base portion 32 with a pin body 34 extending outwardly from the base portion 32 toward the third shift shaft 16c. The pin body 34 is smaller in cross-section than the base portion 32. The base portion 32 is received within the bore 22 and the pin body 34 is received within a smaller bore 36 that extends to the third opening 14c for the third shift shaft 16c. The bore 36 is sized to provide proper alignment of the plunger 30 relative to the third shift shaft 16c.

The plunger 30 is disposed within the bores 22, 36 in a floating mount. As the third shift shaft 16c is shifted, a switch surface on the third shift shaft causes the pin body 34 to move upwardly, which causes the base portion 32 of the plunger 30 to actuate the neutral switch 24.

The base portion 32 of the plunger 30 includes a first switch pin engagement surface 40 and a second switch pin engagement surface 42. The first 40 and second 42 switch pin engagement surfaces are preferably on opposing sides of the base portion 32 to accommodate the positions of the first 16a and second 16b shift shafts. The first 40 and second 42 switch pin engagement surfaces preferably provide a tapering transition from a maximum dimension of the base portion 32 to the pin body 34.

A first switch pin 44 is positioned between the first shift shaft 16a and the plunger 30 and a second switch pin 46 is positioned between the second shift shaft 16b and the plunger 30. The first switch pin 44 is received within a first bore 50 formed in the housing 12 and the second switch pin 46 is received within a second bore 52 formed in the housing 12. The first 50 and second 52 bores are sized to provide a floating support, which aligns and holds the first 44 and second 46 switch pins in a proper position relative to the first 16a and second 16b switch shafts while still allowing axial movement of the first 44 and second 46 switch pins within the first 50 and second 52 bores. The first switch pin 44 cooperates with the first switch pin engagement surface 40 to move the plunger 30 and actuate the neutral switch 24, in response to shifting of the first shift shaft 16a. The second switch pin 46 cooperates with the second switch pin engagement surface 42 to move the plunger 30 and actuate the neutral switch 24, in response to shifting of the second shift shaft 16b.

Figure 2:
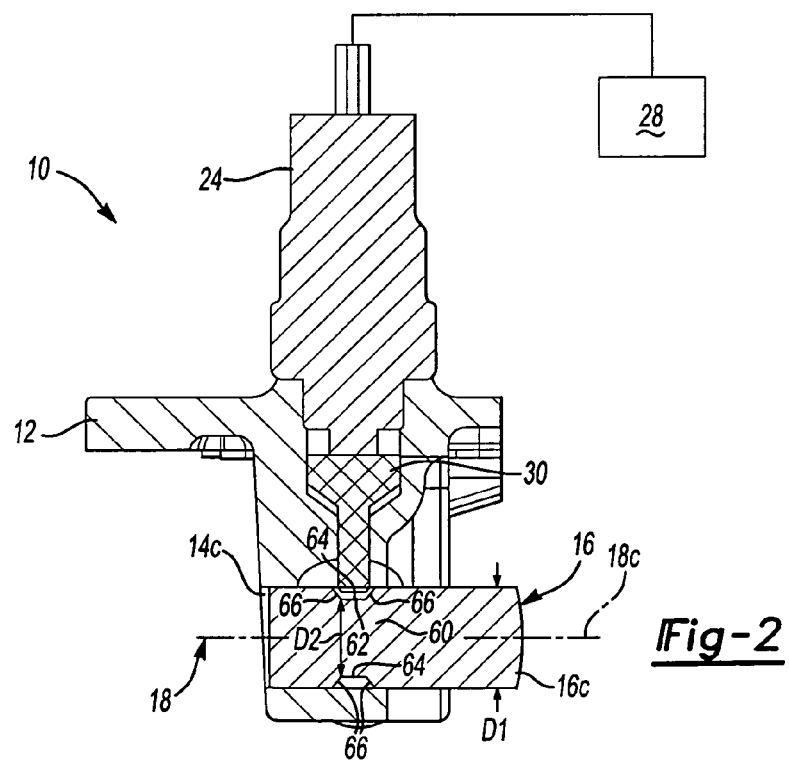
FIG. 2 is a schematic cross-sectional view of an example switch profile for a shift shaft.

Each of the first 16a, second 16b, and third 16c shift shafts has a shaft portion 60 with a switch profile 62, see FIG. 2 as an example. The switch profile 62 provides a contoured or variable surface along a length of each shift shaft 16. The switch profiles 62 of the first 16a and second 16b shift shafts are aligned with the first 44 and second 46 switch pins, respectively. The switch profile 62 of the third shift shaft 16c is aligned with the pin body 34 of the plunger 30. An example of one switch profile 62 for the third shift shaft 16c is shown in FIG. 2. Switch profiles 62 for the first 16a and second 16b shift shafts could be similar to or different from the switch profile 62 shown in FIG. 2.

In the example of FIG. 2, the third shift shaft 16c is defined by a constant maximum dimension D1, which generally corresponds to a shaft outer diameter. This maximum dimension D1 extends along a substantial length of the third shift shaft 16c. The shaft portion 60 that is defined by the switch profile 62 is aligned with the plunger 30 as shown. The switch profile 62 is defined by base portion 64 of a minimum dimension D2, which is smaller than D1. Tapered surfaces 66 extend from each edge of base portion 64 to the maximum dimension D1. The tapered surfaces 66 facilitate providing a desirable shifting feel and effort as the third shift shaft 16c is shifted along the third axis 18c.

The plunger 30 is initially aligned with the base portion 64. As the third shift shaft 16c is translated along the third axis 18c, one of the tapered surfaces 66 engages the pin body 34 of the plunger 30 and forces the pin body 34 linearly upwardly toward the neutral switch 24. When the pin body 34 has traveled upwardly to engage the third shift shaft 16c at the maximum dimension D1, the neutral switch 24 has been actuated.

The switch profiles 62 for the first 16a and second 16b shift shafts are similarly formed to provide independent actuation of the neutral switch 24. The first 44 and second 46 switch pins operate independently from each other. Further, the plunger 30 is actuated by the third shift shaft 16c independently from the first 44 and second 46 switch pins. Thus, three different shift shafts 16a, 16b, and 16c each cooperate with a common plunger 30 to activate a single neutral switch without requiring a checkshaft. The profiles on the shift shafts 16a, 16b and 16c are designed such that when the neutral switch 24 is actuated, one of the shift shafts 16a, 16b, 16c, is in a position indicative of the transmission 10 being in neutral (i.e., no gears are engaged to transmit drive).

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A vehicle transmission comprising:
   a transmission housing;
   a plurality of shift shafts disposed within said transmission housing with each shift shaft being movable along an axis;
   a plunger adapted for independent actuation by each of said plurality of shift shafts, said plunger comprising a single-piece component having an enlarged head portion that directly transitions into a reduced body portion; and
   a neutral switch aligned with said enlarged head portion, said neutral switch being received within a neutral switch bore formed within said transmission housing, and wherein said enlarged head portion of said plunger extends into said neutral switch bore with said neutral switch being actuatable by each of said plurality of shift shafts to control range shifts in response to actuation by said plunger.

2. The vehicle transmission according to claim 1 wherein said neutral switch comprises a single switch that is independently actuated by each shift shaft from said plurality of shift shafts.

3. The vehicle transmission according to claim 1 wherein said plunger is positioned directly between one shift shaft of said plurality of shift shafts and said neutral switch.

4. The vehicle transmission according to claim 3 including a plurality of switch pins wherein each switch pin is positioned directly between another one of said plurality of shift shafts and said plunger.

5. The vehicle transmission according to claim 4 wherein said plurality of shift shafts each include a switch profile aligned with at least one of said plunger and said plurality of switch pins.

6. The vehicle transmission according to claim 5 wherein said plurality of shift shafts are each defined by a maximum outer dimension and wherein said switch profile defines a shaft portion having a dimension that is smaller than said maximum outer dimension.

7. A vehicle transmission comprising:
a transmission housing;
a plurality of shift shafts disposed within said transmission housing with each shift shaft being movable along an axis;
a plunger adapted for independent actuation by each of said plurality of shift shafts, said plunger comprising a single-piece component having an enlarged head portion that directly transitions into a reduced body portion, and wherein said reduced body portion comprises a pin body that extends from said enlarged head portion to a distal end to define a length of said plunger that is greater than a width of said plunger;
a neutral switch aligned with said enlarged head portion, said neutral switch being actuatable by each of said plurality of shift shafts to control range shifts in response to actuation by said plunger, and wherein said plunger is positioned directly between one shift shaft of said plurality of shift shafts and said neutral switch, and wherein said pin body extends outwardly from said enlarged head portion to be engageable with said one shift shaft of said plurality of shift shafts;
a plurality of switch pins wherein each switch pin is positioned directly between another one of said plurality of shift shafts and said plunger; and
a plurality of switch pin engagement surfaces formed on said enlarged head portion wherein each one of said plurality of switch pin engagement surfaces is engageable against a corresponding one of said plurality of switch pins.

8. The vehicle transmission according to claim 1 including first and second switch pins that are engageable with said plunger and wherein said plurality of shifts shafts comprises at least a first shift shaft, a second shift shaft, and a third shift shaft with said first switch pin engaging said first shift shaft, said second switch pin engaging said second shift shaft, and said plunger engaging said third shift shaft.

9. The vehicle transmission according to claim 8 wherein said first, said second, and said third shift shafts are all generally parallel to each other with said third shift shaft being positioned intermediate said first shift shaft and said second shift shaft.

10. A vehicle transmission comprising:
a neutral switch;
a plunger for selectively activating said neutral switch, said plunger comprising a single-piece component having an enlarged base portion that directly transitions into a reduced body portion;
first and second switch pins engageable with said enlarged base portion of said plunger;
a first shift shaft movable along a first axis and engageable with said first switch pin;
a second shift shaft movable along a second axis and engageable with said second switch pin;
a third shift shaft movable along a third axis and being engageable with said reduced body portion of said plunger wherein movement of at least one of said first, said second, and said third shift shafts along a respective one of said first, said second, and said third axes actuates said neutral switch;
wherein said reduced body portion of said plunger comprises a pin body extending outwardly from said enlarged base portion toward said third shift shaft to define a plunger length that is greater than a plunger width; and
first and second switch pin engagement surfaces formed as tapered surfaces on said enlarged base portion wherein said first switch pin engagement surface is engageable with said first switch pin and said second switch pin engagement surface is engageable with said second switch pin.

11. The vehicle transmission according to claim 10 wherein said third shift shaft is intermediate said first and said second shift shafts with said first axis, said second axis, and said third axis being parallel to each other, and wherein said first switch pin extends transversely relative to said first axis, said second switch pin extends transversely relative to said second axis, and said plunger extends transversely relative to said third axis.

12. The vehicle transmission according to claim 10 wherein said first shift shaft has a first switch profile aligned with said first switch pin, said second shift shaft has a second switch profile aligned with said second switch pin, and said third shift shaft has a third switch profile aligned with said plunger and wherein movement of said first switch pin along said first switch profile, movement of said second switch pin along said second switch profile, and movement of said plunger along said third switch profile results in axial movement of said plunger against said neutral switch.

13. The vehicle transmission according to claim 12 wherein said first shift shaft is substantially defined by a generally constant first shaft dimension and wherein said first switch profile is defined by a first switch pin dimension that is different than said first shaft dimension; said second shift shaft is substantially defined by a generally constant second shaft dimension and wherein said second switch profile is defined by a second switch pin dimension that is different than said second shaft dimension; and said third shift shaft is substantially defined by a generally constant third shaft dimension and wherein said third switch profile is defined by a third switch pin dimension that is different than said third shaft dimension.

14. A method of controlling vehicle transmission range shifts using a common neutral switch comprising the steps of:
(a) providing a plurality of shift shafts each movable along a respective axis and a plunger comprising a single-piece component having an enlarged base portion that directly transitions into a reduced body portion;
(b) positioning a neutral switch within a neutral switch bore formed within a transmission housing such that the enlarged base portion of the plunger extends into the neutral switch bore;
(c) actuating the neutral switch via the plunger in response to movement of one of the plurality of shift shafts along one axis; and
(d) moving the plunger via a switch pin to actuate the neutral switch in response to movement of another one of the plurality of shift shafts.

15. The method according to claim 14 wherein the plurality of shift shafts includes at least a first shift shaft, a second shift shaft, and a third shift shaft; and including positioning a first switch pin between the plunger and the first shift shaft, positioning a second switch pin between the plunger and the second shift shaft, and positioning the plunger between the neutral switch and the third switch shaft, and wherein step (c) includes moving the plunger in response to movement of the third shift shaft along one axis and step (d) includes independently moving the plunger with at least one of the first and second switch pins in response to respective movement of at least one of the first and second shift shafts along another axis.

16. The method according to claim 15 including forming a first variable profile on the first shift shaft and aligning the first switch pin for engagement with the first variable profile; forming a second variable profile on the second shift shaft and aligning the second switch pin for engagement with the second variable profile; and forming a third variable profile on the third shift shaft and aligning the plunger for engagement with the third variable profile.

17. The vehicle transmission according to claim 4 wherein said enlarged head portion includes a first switch pin engagement surface to directly engage a first switch pin and a second switch pin engagement surface to directly engage a second switch pin, and wherein said reduced body portion of said plunger directly engages one shift shaft.

18. The vehicle transmission according to claim 17 wherein said first and said second switch pin engagement surfaces comprise tapered surfaces.

19. A vehicle transmission comprising:
a neutral switch received within a neutral switch bore formed within a transmission housing;
a plunger for selectively activating said neutral switch, said plunger comprising a single-piece component having an enlarged base portion that directly transitions into a reduced body portion, and wherein said enlarged base portion of said plunger extends into said neutral switch bore;
first and second switch pins engageable with said enlarged base portion of said plunger;
a first shift shaft movable alone a first axis and engageable with said first switch pin;
a second shift shaft movable along a second axis and engageable with said second switch pin; and
a third shift shaft movable along a third axis and being engageable with said reduced body portion of said plunger wherein movement of at least one of said first, said second, and said third shift shafts along a respective one of said first, said second, and said third axes actuates said neutral switch.

20. A method of controlling vehicle transmission range shifts using a common neutral switch comprising the steps of:
(a) providing a plurality of shift shafts each movable alone a respective axis and a plunger comprising a single-piece component having an enlarged base portion that directly transitions into a reduced body portion, and wherein the plunger defines an axis that extends along a length of the plunger from the enlarged base portion to the reduced body portion, the length of the plunger being greater than a width of the plunger;
(b) forming a first switch pin engagement surface on the enlarged base portion to directly engage a first switch pin, forming a. second switch pin engagement surface on the enlarged base portion to directly engage a second switch pin, forming the reduced body portion of the plunger as a pin body that directly engages one shift shaft, and moving the plunger along the axis in response to at least one of the first switch pin actuating the first switch pin engagement surface, the second switch pin actuating the second switch pin engagement surface, or the pin body being actuated by the one shift shaft;
(c) actuating a neutral switch via the plunger in response to movement of one of the plurality of shift shafts along one axis; and
(d) moving the plunger via one of the first and second switch pins to actuate the neutral switch in response to movement of another one of the plurality of shift shafts.

* * * * *

UNITED STATES PATENT AND TRADEMARK OFFICE
CERTIFICATE OF CORRECTION

PATENT NO. : 7,540,209 B2 Page 1 of 1
APPLICATION NO. : 11/098833
DATED : June 2, 2009
INVENTOR(S) : Scheib et al.

It is certified that error appears in the above-identified patent and that said Letters Patent is hereby corrected as shown below:

In the Claims:

Claim 15, Column 7, Line 1:

Replace "third switch shaft" with "third shift shaft"

Signed and Sealed this

Eighteenth Day of August, 2009

David J. Kappos
*Director of the United States Patent and Trademark Office*